United States Patent
Leleve et al.

(10) Patent No.: US 7,068,240 B2
(45) Date of Patent: Jun. 27, 2006

(54) METHOD OF IMAGE CORRECTION FOR AN EYE LEVEL IMAGE PROJECTOR, AND APPARATUS FOR PERFORMING THE METHOD

(75) Inventors: Joël Leleve, Bobigny Cedex (FR); Pierre Albou, Bobigny Cedex (FR); Cyrille Coutte, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 412 days.

(21) Appl. No.: 10/316,816

(22) Filed: Dec. 11, 2002

(65) Prior Publication Data
US 2003/0112418 A1 Jun. 19, 2003

(30) Foreign Application Priority Data
Dec. 13, 2001 (FR) ................................. 01 16145

(51) Int. Cl.
*G09G 5/00* (2006.01)
(52) U.S. Cl. .......................................... 345/7; 359/630
(58) Field of Classification Search ............... 345/6–9; 359/630; 348/6, 115
See application file for complete search history.

(56) References Cited

U.S. PATENT DOCUMENTS

| 5,302,964 | A | * | 4/1994 | Lewins | 345/7 |
| 5,305,012 | A | * | 4/1994 | Faris | 345/7 |
| 5,726,670 | A | | 3/1998 | Tabata et al. | 345/7 |
| 5,758,941 | A | * | 6/1998 | Stahl | 353/69 |
| 5,805,119 | A | | 9/1998 | Erskine et al. | 345/7 |
| 6,522,312 | B1 | * | 2/2003 | Ohshima et al. | 345/8 |
| 2002/0084950 | A1 | * | 7/2002 | Aoki et al. | 345/7 |

OTHER PUBLICATIONS

French Search Report, Aug. 29, 2002.

* cited by examiner

*Primary Examiner*—Sumati Lefkowitz
*Assistant Examiner*—Rodney Amadiz
(74) *Attorney, Agent, or Firm*—Morgan & Finnegan, LLP (57) ABSTRACT

A vehicle has an eye level display for displaying information to the driver by means of images projected on to the windshield and reflected off it. The eye level display system includes means for correcting the image projected, in order substantially to eliminate multiple images. The projected image is corrected essentially by producing a corrected image, in the form of a digital matrix, before it is projected on the windshield by the projector. In one embodiment, the corrective processing step comprises inverting the matrix characteristic of the multiplication caused by the windshield. In another embodiment, it consists in producing a corrected image adaptively by minimising an error function below a predetermined threshold.

15 Claims, 2 Drawing Sheets

METHOD OF IMAGE CORRECTION FOR AN EYE LEVEL IMAGE PROJECTOR, AND APPARATUS FOR PERFORMING THE METHOD

FIELD OF THE INVENTION

The present invention relates to a method of image correction for a so-called "eye level" display. It also relates to apparatus for performing such a method.

BACKGROUND OF THE INVENTION

Various systems are known in the current state of the art for producing an image which is reflected off the front windshield of a vehicle, the image in general being one that conveys information to an occupant of the vehicle, typically the driver. Display of the image at eye level enables the driver to receive the information thereby conveyed without turning his head towards instruments or other means for displaying information, which are conventionally arranged for example in the fascia of the vehicle.

However, vehicle windshields consist of laminated sheets of glass and/or polymers, which produce multiple reflections and refractions. In other words, each time a light ray passes into the windshield from one interface between two layers of the latter and another, the light flux emitted by an eye level display projector undergoes both reflection and refraction, so that the observer will perceive an image which is multiplied into at least two apparitions of the same image, albeit at different strengths. This is the image multiplication effect caused by the windshield, in which the multiple images consist of the main projected beam and at least one copy thereof, displaced from the main projected beam in what may be called the direction of image multiplication.

In order to provide a remedy for these drawbacks, it has been proposed to use, locally on the windshield, semi-reflective layers or holographic reflectors which have a very high reflectivity for a given wavelength, so causing the other reflections to be negligible. Because the layers of the windshield are substantially transparent to natural light, they would in principle be required not to impair the direct vision of the driver.

However, the semi-reflective layer is visible because of the angular dependence of its reflective response. This disadvantage gives rise to visual discomfort for the driver. Moreover, for safety reasons, this local deformation is forbidden in some zones of the windshield by most motor vehicle regulations.

DISCUSSION OF THE INVENTION

One object of the invention is to eliminate the factors tending to impair vision through the windshield when an eye level image projector is used.

A further object of the invention is to eliminate any need to incorporate in the windshield (or to associate with it) expensive optical devices, which can themselves interfere with vision, within the windshield of a vehicle having an eye level image projector.

According to the invention in a first aspect, a method of image correction for an eye level image projector comprises the steps of:

producing a digital image in the form of a matrix, each cell of which represents a point on the image to be viewed by projection;

applying a corrective processing step which is dependent on optical and geometrical characteristics of the windshield and which produces a deformation of the projected image, such that the image multiplication effect whereby multiple projection images are produced is reduced; and the light flux is projected on the windshield.

Preferably, the corrective image processing step consists in shifting, in a direction away from the direction of multiplication of the image, each horizontal line of the matrix produced from a predetermined number of image lines.

According to a preferred feature of the invention, the corrective processing step consists in producing a corrective matrix calculated by matrix inversion of a matrix characteristic of the image multiplication effect produced by the windshield, and applying a matrix product with the matrix to be displayed, whereby to produce the corrected matrix for projection on the windshield. Then, preferably, the corrective processing step further includes a step of shifting values of the corrected matrix in such a way that no value of the matrix is negative.

The step of shifting values of the corrected matrix is preferably followed by a step of reducing the dynamic of the corrected matrix. Under these circumstances, preferably, as a function of the contrasts measured on the corrected matrix, a step of amplification of the contrasts on the image initially generated is performed in such a way as to provide an image for projection having contrasts greater than a predetermined threshold.

According to a further feature of the invention, the corrective processing step consists in producing an error matrix comprising the difference between a matrix simulating the image multiplication effect introduced by the windshield and the matrix effectively generated, and then producing an error criterion and modifying the cells of the matrix of the image to be projected that is in course of being adapted, whereby to minimize the error matrix and/or a scalar measurement of the latter.

Preferably then, the step of producing an error criterion consists in projecting the values of the said matrix simulating the effect of multiplication of the image to be projected in a range of values in the range between 0 and 1, deducing a scalar error value according to a predetermined function, such as the sum of absolute values of the intervals between the simulation matrix and the matrix to be projected, and modifying the cells of the matrix to be projected in such a way that the scalar error criterion is below a predetermined threshold. Preferably, each column of the matrix to be projected is, during the process of minimizing the error, divided into a plurality of sub-columns in order to reduce the number of components of minimization.

The criterion for minimization of the error is preferably established in such a way as to have regard to the transitions in the image to be projected, by applying a matrix gradient operator on the image to be projected and testing the minimization on the gradient of the image to be projected and the gradient of the original image. The step of minimizing the criterion preferably comprises calculation of a predetermined linear combination of a distance criterion and a criterion as to the derivatives. This step of calculating the criterion for minimization of the error preferably comprises a step of calculating the logarithm whereby to take account of the dynamic of the eye.

According to the invention in a second aspect, apparatus for performing a method according to the first aspect of the invention by applying the method to an eye level image projector for projecting images on a motor vehicle windshield, comprises:

a generator of images to be projected;

an image corrector for applying a corrective processing step which depends on the optical and geometrical characteristics of the windshield, and for producing a deformation of the projected image such that the multiplication effect in the viewed image is reduced; and an image projector for projecting the corrected image on the windshield, arranged to receive the image after processing and to produce a light flux to be reflected at least partially towards the windshield.

Further features and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 1:
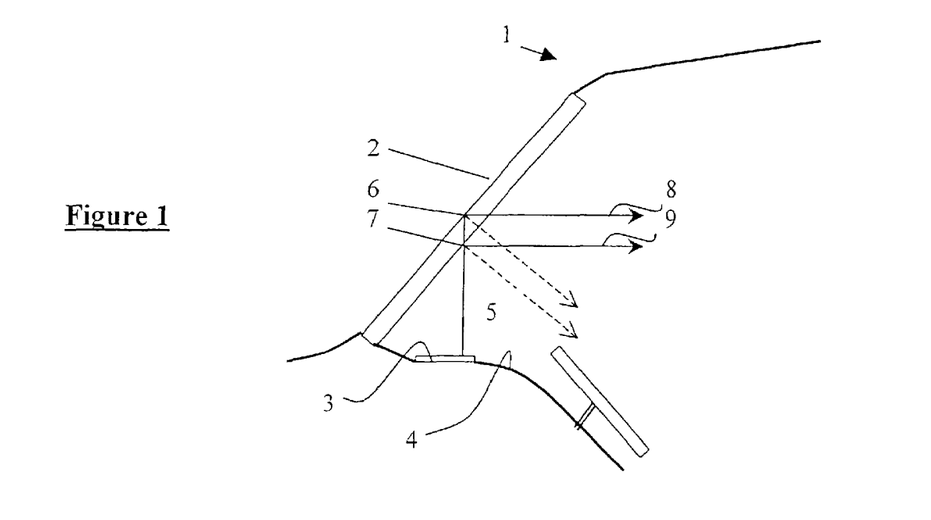
FIG. 1 is a diagram illustrating the problem of image in an eye level image projector.

The diagram in FIG. 1 illustrates the problem of image multiplication, discussed earlier herein, in an eye level image projector, which is installed on the fascia 4 of a vehicle 1. This projector has an image emitting surface on a liquid crystal display panel 3 which emits light in the form of a parallel rays, such as the ray shown as a vertical line in FIG. 1, which is incident at a point of incidence 5 on the inside face of the windshield 2 of the vehicle, so as to produce a reflected ray 9 which has a first intensity I(9), together with a refracted ray which has a second intensity R(9)

The refracted ray, having the intensity R(9), continues its path through the thickness of the windshield, and then passes, at the point 6, through the glass-air dioptre consisting of the surface of separation of the windshield 2 with the air outside the vehicle 1. As explained above, the light ray undergoes partial reflection and partial refraction, so that a reflected ray (not shown in the drawing) returns into the interior of the vehicle and once again passes through the separation surface between the material of the windshield and the air inside the vehicle. This results in a third separation of light intensity, and a refracted ray 8 is then produced. This causes an observer in the driver's seat to receive an offset, and weaker, copy of the image which is produced by the first reflection, that is to say by the ray 9. It is found that under some circumstances, further refracted rays can be produced, for example when the intensity of the image initially emitted is strong enough for other refractions to be again sensitive to a third ray analogous to the rays 9 and 8 and offset further upwards, so that it too is visible.

It will also be understood that, in the case of laminated windshields, a larger number of dioptres are encountered in the optical path of propagation of the rays emitted by the projection surface 3, and that this therefore gives rise to an increased number of rays transmitted towards the observer of the image from a single point on the projection surface 3.

In the current state of the art, one zone of the windshield is reserved for receiving an optical apparatus consisting basically of prisms or hologram generators for reducing the multiplication of images described above. However, as indicated in the foregoing discussion of the background of this invention, this does give rise to disadvantages, both in the manufacture of the windshield and in terms of comfortable use of an eye level image projector. This last point arises in particular because the display of information will then only be able to take place within a relatively small space on the windshield surface, this space being the one at which the optic for correcting the image multiplication effect is located.

Now depending on driving circumstances, in particular during night driving and when the vehicle is equipped with apparatus for assisting night vision, it is important that as much as possible of the zone of visibility in the windshield is able to receive an image produced by the eye level image projector.

The present invention removes the need to modify the windshield, and, as a function of the geometrical and optical characteristics of the windshield that are recorded beforehand, the method here to be described involves generating a deformed image at the level of the emitting surface 3 from which the eye level image is emitted, in such a way that the multiplication effect (in the broad sense) produced by the windshield 2 is corrected.

Figure 2:
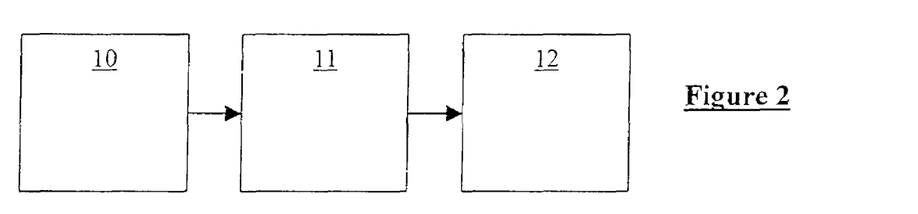
FIG. 2 is a block diagram of an eye level projection device multiplication employing the method of the invention.

Reference is now made to the block diagram of FIG. 2. The image to be projected is produced by an image generator 10. The generator 10 produces each image in the form of a matrix, each cell of which corresponds to the characteristic of one point on the image which it is desired to present to the observer. Particularly in the case of an image in the grey scale, each cell is limited to a positive number in the range between 0 and a maximum value which corresponds to the maximum intensity of the ray 9 that it is desired to project. In the case of a colored image, each cell contains a sub-matrix or vector, each cell of which comprises a number representing the chromatic component of the ray 9 which it is desired to project.

The image generator 10 may be connected to the output of a suitable device for assisting vision (e.g. in fog or low-light conditions) or night vision, comprising a camera or an infrared camera, a circuit for analyzing and processing the image produced by the camera, and an output circuit connected to the input of the image generator 10.

The image generator 10 may be connected to the output of a device for displaying a cartographic or map image produced by a road guidance apparatus equipped with a CD-ROM reader or a GPS interface and a circuit for presenting route information, such as is known in the current state of the art.

Again, the image generator 10 may be connected to the output of a device for displaying information generated by the computer mounted on board the vehicle, whereby to present visual information, for example in the form of icons representing various alarm situations or states of components of the vehicle, or again, alphanumeric messages such as indications of the speed of the vehicle and the level of fuel in the fuel tank or battery charge level.

The image generator 10 performs on the input signal which it receives a processing step in which each matrix representing the image to be presented to the driver is configured in such a way as to enable it to be made use of in the remainder of the hardware. In particular, the image generator 10 may comprise, separately or in combination, the following:
- a circuit for converting the matrix representing the input image into a square matrix;
- a circuit for adapting the dynamic of the image;
- and a circuit for adapting the contrasts within the image.

The apparatus also includes an image corrector 11 which is connected to the output of the image generator 10. The image corrector 11 applies a corrective processing step depending on the optical and geometrical characteristics of the windshield 2 as described above with reference to FIG. 1. The processing step consists essentially of deforming the projected image, in such a way that the effect of multiplication of the image seen by projection on the windshield 2 is reduced. The nature of this corrective processing step will be described later herein.

The apparatus also includes an image projector 12 for projecting images towards the windshield 2. The projector 12 receives the image from the output of the image corrector 11 after the latter has processed the image, and produces a light flux to be at least partially reflected towards the windshield, the light flux being produced, in one embodiment, by a liquid crystal panel which is equipped with a projection lens if necessary. In other embodiments, the light flux is produced with the aid of any of the following:
- a plasma panel;
- a panel of light emitting diodes, which may be separate or integral;
- a miniature cathode ray tube.

The image projector 12 is equipped with a circuit for regulating the light flux and other characteristics of the projected image. This adjustment may be made as decided by the driver, or it may be performed automatically by automatic means (not shown), or the projector may be arranged to offer both methods of regulation. Where automatic regulation is provided, it is arranged to adapt the light flux of the projected image to the optical circumstances detected on the windshield, for example the amount of sunlight shining on the windshield, or the appearance of a beam produced by headlights of oncoming vehicles.

In the remainder of this description, the case to be considered will be that in which the image produced by the image generator 10 is represented by a defined positive square matrix with whole number coefficients.

The deformation applied by a windshield 2 is represented by a matrix transformation function D(), in such a way that, the image projected by the projector 3 being represented by a matrix B, the image reflected by the windshield 2 towards the driver of the vehicle is represented by a matrix C defined by the relation:

$$C=D(B) \quad (1)$$

The inventors have found that the deformation D( ) applied by the windshield 2 was correctly represented in most cases by a relationship of the form:

$$C=\rho(I+D_\kappa)B, \quad (2)$$

in which $\rho$ represents the overall reflection coefficient applied by the windshield 2, and I is the unity matrix, in which all the non-diagonal elements are zero and the main diagonal consists of cells of value 1.

In order to simplify the explanation of the invention here, a windshield will be considered which is substantially homogeneous and flat. A person skilled in this technical field will be able to adapt this description to the case of a complex windshield having a predetermined curvature, and, where necessary, a predetermined general law of reflection varying in accordance with the position of the image projected on the windshield 2.

In a preferred embodiment of the method of the invention, therefore, the matrix $D_\kappa$ consists of a square matrix in which all the elements are zero except the κ'th diagonal, each cell of which has the value $(1-\rho)$.

The deformation produced corresponds to a shift, towards the top of the windshield, of the image actually reflected towards the driver.

The term in $(1-\rho)$ corresponds to a second reflection on the rear face of the windshield 2. It is clear that the term in $(1-\rho)$ cannot be constant along the κ'th diagonal if the optical characteristics of the windshield are variable along a direction which is vertical along the windshield. In that case, a person skilled in this technical field will be capable of suitably modifying the process described.

Similarly, several matrices $D_\kappa$ may be used, in particular if the windshield 2 is presented in the form of a plurality of layers, in which the surfaces of the layers in contact with each other constitute distinct dioptres. The values of κ and the elements of the non-zero κ'th diagonal are themselves determined by measurement beforehand during the configuration of the apparatus that performs the method here being described, whereby to match it to a particular windshield and vehicle.

In another embodiment, the matrix D consists of a two-dimensional arrangement of cells representing the complex optical behavior in transmission and reflection of each point on the windshield 2 on which a ray 5 issued from the image projector 3 is incident. Thus, D is the coefficient, or a block of coefficients, which measure the transmission and reflection of the ray that comes from a point M of the corresponding zone on the windshield 2. Such a coefficient may be expressed by an analytical function of p, the coefficient of reflection on the first dioptre encountered by the ray 5 with the windshield 2.

In such a case, equation (1) above is rewritten in the form:

$$C=\Sigma_\kappa(R+D_\kappa)B \quad (3)$$

in which:
- the various values of κ correspond to each of the vertical shifts applied by each dioptre contained in the thickness of the windshield 2,
- R is a diagonal matrix in which the r'th element corresponds to the optical characteristics of the zone of incidence on the windshield in geometrical relationship with the said r'th element, and
- $D_\kappa$ is the matrix of vertical deviation of κ lines associated with the multiplication effect of one of the dioptres of the windshield 2, the non-zero κ'th diagonal of which comprises an r'th element corresponding to the optical characteristics of the zone of incidence on the windshield in geometrical relationship with the said r'th element.

In another embodiment, the overall reflection coefficient $\rho$ depends on the wavelength and therefore on the color produced by the image projector 3. As a result, in this case, the process for correction of multiplication takes into account the adaptation of each term of the matrices D, or the term of the diagonal matrix R in equation (3).

In a further embodiment, because of the positioning of the eye level image projector 3 on the fascia 4 of the vehicle, the angle of emission of the projected rays 5 may be different from the direction indicated in FIG. 1, and in particular, it may not be constant along the emitting surface of the projector 3. In that case, and also if the projector 3 carries an optic for modifying the projection, the optical characteristics are effected in accordance with a predetermined law which a person skilled in this technical field will know how to adapt to the matrix function D() described above.

In yet another embodiment, the image to be projected is a perspective image, and is intended for binocular vision. A particular correction law must therefore be determined and adapted to the matrix function Do described above.

In accordance with the method of the invention, an inversion of the matrix function D(), equivalent to the multiplication effect of the windshield 2, is performed on the matrix A of the image by applying a corrective treatment T() defined by the relation:

$$T(A)=(R+D_\kappa)^{-1}A \qquad (4)$$

with the notations of equation (3) defined above for two dioptres only, consisting of the two faces of the windshield 2. In equation (4), A is a whole-number, positive, defined square matrix representing the image applied at the input of the corrective circuit 11 by the image generator 11 of the apparatus for performing the method of the invention.

The principle of the invention is therefore to produce a corrected image matrix B defined by the matrix relation:

$$B=T \times A \qquad (5)$$

in which T is the inversion matrix deduced from the operation described above for equation (5) as a function of the optical and geometrical characteristics of the windshield and, where appropriate, of the projector 3 proper. The person skilled in this technical field will know how to apply the inversion to the various situations described above.

The method of the invention therefore consists in executing a matrix inversion in accordance with well known methods. To this end, the various coefficients of the matrices R and $D_k$ are loaded beforehand into suitable memories of the correction circuit 11.

It is because the inversion process does not depend on the image matrix A presented at the input, that it is determined in the form of a square matrix T calculated (during configuration of the operating apparatus) as a function of the geometrical and optical characteristics, in particular of the projector 3 and windshield 2 of the vehicle on which it is disposed and registered in a suitable memory.

However, in the majority of eye level image projectors, it is impossible to project an image having negative coefficients. Now the process of inversion of a positive defined square matrix such as the matrix D, representing the image multiplication caused by the windshield 2, does produce negative coefficients.

Figure 3:
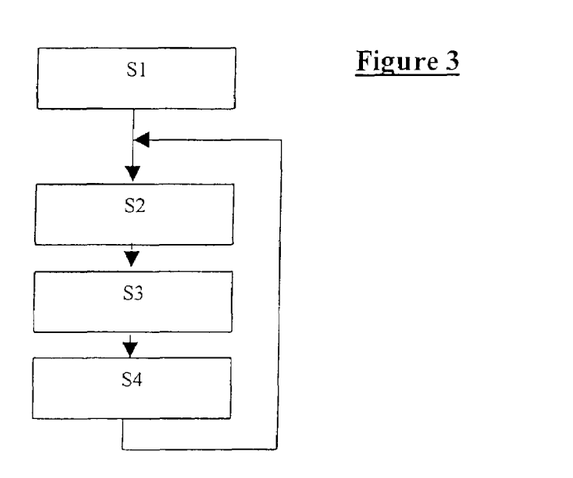
FIG. 3 is a flow diagram for a first embodiment of the method of correction according to the invention.

Reference is now made to FIG. 3 relating to a second embodiment of the correction method. In this embodiment, the method of correction consists, after the configuration step S1 in which the inversion matrix T has been calculated and registered in a memory, in producing, in a second step S2, an image A to display for the driver with the aid of the image generator 10 (FIG. 2), and in executing the matrix product defined by the relation:

$$B1=T \times A \qquad (6)$$

In order to provide a remedy for the presence of negative cells in the matrix B1, especially in the case of a projector 3 for incoherent light, the method includes a third step S3. In this third step a second correction step is carried out after execution of equation (5) in the first step, by applying a shift to the values of the cells of the matrix B in such a way that the most negative of them becomes a zero value. If need be, in order to avoid saturation of the most positive value of the cells of the matrix B1, a step is then carried out in which the dynamic of the declared matrix B1 is reduced in such a way that the most positive value of the matrix B1, after the shift towards higher values from the negative values of the matrix B1, is less than the saturation value of the image, that is to say less than the maximum value of brilliance within a grey scale, such as 255 for an image coding on 8 bits.

In one particular embodiment, the following steps are carried out in succession:

calculation of the matrix B1=T×A;
calculation of the value DECAL(B1)=MIN(B1);
calculation of the value DYN(B1)=MAX(B1);
calculation of the matrix defined by:

$$B=(B1+\text{DECAL}(B1) \times [1])\{\text{DECAL}(B1)+\text{DYN}(B1)\}^{-1} \qquad (7)$$

in which:
the scalar function DECAL( ) enables the shift to be determined in order to render positive each of the cells of the matrix B1, preferably by looking for the smallest value, that is to say the most negative value of B1 by the operator MIN( );
the scalar function DYN( ) enables the dynamic of the image B1 to be determined, preferably by looking for the most positive value of B1 by the operator MAX( );
the matrix [1] is the matrix of the same dimension as B1 which contains 1's everywhere.

The matrix B which is produced is then, in a step S4, projected by the eye level image projector 12 (in the apparatus of FIG. 2). The control then returns to step S2, unless display of the images A is interrupted.

However, it is found that this process produces a reduction in contrasts of the image projected using the projector 3.

In accordance with a further version of the invention, a solution accordingly consists in reinforcing the image A produced by the image generator 10 by applying a multiplying gain greater than 1 which is capable of producing a corrective image B of sufficiently high contrast.

In one version, the amplification gain of the image A produced by the image generator is adjusted manually by the user, with the aid of an adjusting button on the fascia of the vehicle.

In a further version, the amplification gain of the image A produced by the image generator is regulated automatically by a module for detecting contrasts in the image B1 produced at the end of step S2 (FIG. 3), and is automatically raised with respect to a predetermined threshold value.

In another approach to the problem of inversion of the matrix representing the deformation by doubling up which is caused by the windshield, the method comprises executing an adaptation of the image A produced by the image generator 10 (FIG. 2), in such a way that a correction error matrix is minimized.

In this embodiment of the invention, the correction error matrix E is determined by the relation:

$$E=D \times B-A, \qquad (8)$$

in which the notations are as before.

The matrix B produced at the output of the multiplication error correction module 11 (FIG. 2) is initialized on the matrix A. Then each of its coefficients is calculated in such a way as to minimize an error measurement function which is analogous to a norm of the matrix E defined in equation (8).

In a first version, this second approach to the problem of inversion of the matrix M consists in calculating a scale of minimization in accordance with the relation:

$$\text{CRITERION } \Sigma_i (D \times \text{sigmo}(C_i) - V \times \text{Rapp})^2 \quad (9)$$

in which:
D represents the matrix representing the image multiplication effect caused by the windshield, defined as before;
sigmo( ) is a function which projects the real space of the cells of the matrix B which is being adapted, in a range between 0 and 1, and which is defined by the relation:

$$\text{sigmo}(x) = \frac{1}{2}(1-e^{x/2})/(1+e^{x/2}) \quad (10)$$

in which x is the value of any one of the cells of the column $C_i$ of the matrix B in the process of being adapted;
V is a predetermined first coefficient which is registered in advance in a memory of the correction module 11, which depends on the number of sub-columns determined in advance in each column $C_i$ of the matrix B; and
Rapp is a predetermined second coefficient which is defined from the measurement of the ratio of the light intensity recovered after reflection on the windshield of a ray such as the ray 8 in FIG. 1, to the incident light intensity produced by the image B on a ray such as the ray 5 in FIG. 1.

Breaking down each column $C_i$ of the matrix B that is being adapted, into partial sub-columns, enables the number of components of each column to be reduced to a minimum.

It will be noted that the adaptation calculation is here presented starting with columns, that is to say vectorial elements in the direction perpendicular to the main multiplication of the image, which is a multiplication of lines as the present inventors have found to be the case in the current applications. It will be clear that if the image multiplication had been caused by shifting of columns in the projected image, the adaptive process would have been in lines. If the image multiplication is more complex, it may be represented by a linear combination of the two adaptive processes, namely in lines and in columns.

Figure 4:
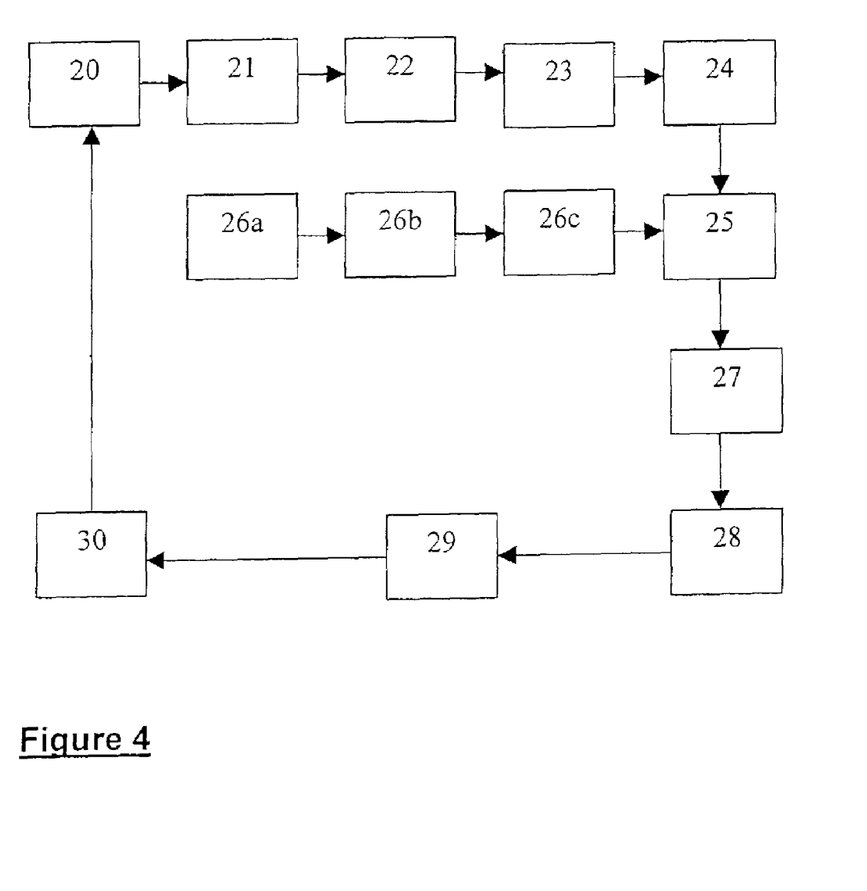
FIG. 4 is a block diagram for part of an apparatus for performing the method of the invention in one particular embodiment.

Reference is now made to FIG. 4, to describe a version of an apparatus for performing the method described above. As shown in FIG. 4, the correction module 11 comprises the following:

a register 20 comprising registration of a variable which represents a column $C_i$ of the matrix B in the course of being adapted, or of a sub column of that matrix which is part of the corrected matrix that will, at the end of the adaptive process, be emitted to the circuit 12 which generates the corrected image to be projected by the projector 3 on to the windshield;

a module 21 for applying the function sigmo( ) defined above to each component of the column $C_i$ of the matrix B or each predetermined sub-column in the register 20;

a register 22 for registering, at each step of the corrective adaptation process, the result of the processing in the module 21, whereby to maintain the value of the column $C_i$ of the matrix B or each sub-column;

a multiplier 23 for multiplying by the matrix D representing the image multiplication effect caused by the windshield, the matrix D being registered in a memory which is initially loaded with optical and geometrical characteristics of the said windshield;

a register 24 for registering the result of the matrix product applied by the operator 23, and representing a column of the image such that it will be effectively viewed through the windshield;

a subtractor 25, having a negative first input for receiving the column in the course of being calculated in the visualization estimated at the output of the register 24, and also having a positive second input which is connected to the output of a multiplier 26c through a second predetermined constant Rapp (which is as defined above in connection with equation (9)), whereby to compose the error matrix E described above;

a circuit 26a for selecting a column of the matrix A in the course of being adapted, corresponding to the sub-column $C_i$ of the matrix B during the first pass in the adaptation process, whereby to produce the corrected matrix B of the image to be projected, the circuit 26a accordingly having an input terminal connected to the output terminal of the generator 10 of images A to be corrected before projection;

a circuit 26b having an input terminal connected to an output terminal in the circuit 26a, so as to receive the columns $C_i$ of the matrix A in the course of being adapted, or each sub-column of the latter, and for applying the operator sigmo( ) (which is as defined above in connection with equation (10)), the circuit 26b also having an output terminal which is connected to the input of the multiplier 26c;

an operator 27 for raising to the square the value of each value issued from the output of the subtractor 25;

an operator 28 for storing, to the extent that they are produced, the components issued from the operator 27, and for accumulating them by the operation defined in equation (9) above, the operator 28 also having an output which produces a digital signal having a value which represents the criterion for minimizing the distances between the image to be projected and the corrected image in the course of being adapted;

an operator 29 for receiving the value CRITERION (see equation (9)) produced at the output of the operator 28, and for comparing it with a predetermined threshold value so as to arrest the adaptation of the matrix B which is in the course of correction when CRITERION is smaller than the said predetermined value;

an operator 30 for determining a modification of each cell of each column $C_i$ of the matrix B being adapted or each sub-column predetermined in the register 20, whereby to reduce the error determined with the aid of CRITERION.

In the various embodiments of the invention, the operator 30 performs the following algorithms:
a descending gradient algorithm;
a simplexing algorithm;
a simulated recovery algorithm; and
a so-called "quasi-Newton" optimization algorithm.

Particularly in the performance of a descending gradient algorithm, the operator 30 comprises:
a circuit for adjusting the starting value of each cell in the sub-column which is in course of being optimized;
a circuit for adjusting the rate of starting of the algorithm; and
a circuit for adapting the degree of resolution in the case of descent of a gradient of the adaptive type.

It is assumed that these various circuits and operators may be achieved with the aid of pre-programmed functions which are executed with the aid of microprogrammed circuits such as microprocessors or signal processors such as DSP.

In another version of the method according to the invention, the adaptive process is so controlled that the quantity CRITERION relates to a criterion for minimizing the established error, in such a way as to have regard to the transitions in the image to be projected. To this end, a matrix gradient operator is applied on the image to be projected, and the minimization is tested on the gradient of the image to be projected and the gradient of the original image. In general terms, the gradient operator is applicable on the matrix of simulation of the image after multiplication, denoted as D x B.

This criterion has been studied in order to have better regard to the transitions within the image. In this connection, the criterion for the distances the execution of which was described above with reference to the operator 28 in FIG. 4 does not take into account the environment of the point being processed as against the derivative. The adaptive correction applied is therefore capable of producing visualization of an image in which the columns have the same gradient as in the original image.

As is well known, the derivative of a column is obtained by multiplying that column by an operator or matrix Grad, having the following form:

$$\text{Grad} = \begin{pmatrix} 3 & -1 & -0.5 & 0 \\ -1 & 3 & -1 & -0.5 \\ -0.5 & -1 & 3 & -1 \\ 0 & -0.5 & -1 & 3 \end{pmatrix} \quad (11)$$

The operator Grad in equation (11) has been indicated in a 4×4 matrix if the sub-column being processed has the dimension 4. It is known to obtain an operator Grad in the form of a matrix N×N if the vector to be derived has the dimension N. In addition, the invention is readily applicable to the case in which the adaptation is performed on lines, and it may be combined in both directions to correct combined image multiplications.

The operator Grad is applied, by means of the operators 26, on the column of the image being adapted and on the register 24, maintaining the column of the image actually viewed such that it is synthesized in the correction module with the aid of the matrix D. On the other hand, the columns have to be processed as a single entity. It is not possible to separate a column into sub-columns. It is accordingly possible to make a simple adaptation of the correction circuit shown in FIG. 4 in order to obtain a criterion for adaptation by minimizing the error on the derivatives.

According to a further aspect of the invention, the step of minimizing the criterion CRITERION explained in the two foregoing embodiments of the process include calculation of a predetermined linear combination of a distance criterion $C_{dis}$, as explained directly above with reference to FIG. 4, and a criterion as to the derivatives, $C_{der}$, which is explained below, with the aid of the matrix Grad.

The criterion for adaptation by minimizing error is now equal to $$\text{CRITERION} = \alpha * C_{dis} + \beta * C_{der} \quad (12)$$

where $\alpha + \beta = 1$.

The coefficients $\alpha$ and $\beta$ are determined in advance in such a way as to accelerate minimization of the error.

In accordance with another aspect of the invention, the step of calculating the criterion for minimization of the error comprises a step of calculating the logarithm so as to take account of the dynamics of the eye.

The eye has a logarithmic response. It is more sensitive in low intensities than in high intensities. The idea on which this embodiment is based is therefore to enter a logarithmic function into the calculation of the criterion, which may be through any one of the three variants described above as to distances, or derivatives, or their linear combination.

The distance criterion was determined in equation (9), and by modifying it according to the invention so as to take account of the sensitivity of the human eye, it becomes $$\text{CRIT}_{LOG} = \Sigma_i (\log(D * \text{sigmo}(C_i) + \text{eps}) - \log(V * \text{Rapp} + \text{eps}))^2 \quad (14)$$

where eps is determined at a value different from 0 so as to avoid having an indeterminate value log (0). Its value has been tested manually in order to obtain its optimum.

The criterion as to the derivatives is similarly adapted by using the following relationships in which $C_{der}$ is considered as a function of the variables associated with each column $C_i$ in the corrected matrix A which is in the course of being adapted:

$$\delta C_{der}/\delta C_i = \Sigma_i 2 * \text{Vect}(C_i) * \delta(\text{Vect} C_i)/\delta C_i \quad (15)$$

where $$\text{Vect}(S) = \log(D \times \text{sigmo}(S) + \text{eps}) - \log(V \times \text{Rapp} + \text{eps}) \quad (16)$$

$$\begin{array}{c} K1(1,i)/K2(1,i) \\ K1(2,i)/K2(2,i) \\ \delta(\text{Vect}(C_i))/\delta C_i = (17) \\ K1(N, i)/K2(N, i) \end{array}$$

where $$K1_{(j, i)} = D_{j, i} * \delta(\text{sigmo}(C_i))/\delta C_i \quad (18)$$

$$K2_{(j, i)} = \Sigma_i D_{j, i} * \text{sigmo}(C_i) + \text{eps}$$

The module 11 for correcting the image so as to produce the corrected image B with the aid of one or other of the criteria for minimizing the error E defined in equation (8) above can therefore be provided with calculating circuits for executing the relationships given by equations (15) and (18) above in accordance with the architecture of the module described with reference to FIG. 4.

What is claimed is:

1. A method of image correction for an eye level image projector, comprising the steps of:
   producing a digital image in the form of a matrix, each cell of which represents a point on the image to be viewed by projection;
   applying a corrective processing step which is dependent on optical and geometrical characteristics of a windshield and which produces a deformation of the projected image, such that the image multiplication effect whereby multiple projection images are produced is reduced; and
   the light flux is projected on the windshield, wherein the corrective processing step comprises
   producing a corrective matrix calculated by matrix inversion of a matrix characteristic of the image multiplication effect produced by the windshield, and
   applying a matrix product with the matrix to be displayed, whereby to produce the corrected matrix for projection on the windshield.

2. A method according to claim 1 wherein the corrective image processing step comprises shifting, in a direction away from the direction of multiplication of the image, each horizontal line of the matrix produced from a predetermined number of image lines.

3. A method according to claim 2, wherein the corrective processing step comprises
producing an error matrix comprising the difference between a matrix (D×B)
simulating the image multiplication effect introduced by the windshield and the matrix (A) effectively generated, and then
producing an error criterion and modifying the cells of the matrix (B) of the image to be projected that is in course of being adapted, whereby to minimize the error matrix and/or a scalar measurement of the latter.

4. A method according to claim 3, wherein the step of producing an error criterion comprises
projecting the values of the said matrix (D×B) of simulating the effect of multiplication of the image to be projected, in a range of values between 0 and 1,
deducing a scalar error value according to a predetermined function, such as the sum of absolute values of the intervals between the simulation matrix and the matrix to be projected, and
modifying the cells of the matrix to be projected in such a way that the scalar error criterion is below a predetermined threshold.

5. A method according to claim 4, wherein each column of the matrix to be projected is, during the process of minimizing the error, divided into a plurality of sub-columns in order to reduce the number of components of minimization.

6. A method according to claim 4, wherein the criterion for minimization of the error is established in such a way as to have regard to the transitions in the image to be projected, by applying a matrix gradient operator on the image to be projected and testing the minimization on the gradient of the image to be projected and the gradient of the original image.

7. A method according to claim 6, wherein the step of minimizing the criterion comprises calculation of a predetermined linear combination of a distance criterion and a criterion as to the derivatives.

8. A method according to claim 7, wherein the step of calculating the criterion for minimization of the error comprises a step of calculating the logarithm whereby to take account of the dynamic of the eye.

9. A method according to claim 1, wherein the corrective processing step further comprises a step of shifting values of the corrected matrix in such a way that no value of the matrix is negative.

10. A method according to claim 9, wherein the step of shifting values of the corrected matrix is followed by a step of reducing the dynamic of the corrected matrix.

11. A method according to claim 10, wherein as a function of the contrasts measured on the corrected matrix, a step of amplification of the contrasts on the image initially generated is performed in such a way as to provide an image for projection having contrasts greater than a predetermined threshold.

12. Apparatus for performing a method according to claim 1 by applying the method to an eye level image projector for projecting images on a motor vehicle windshield, comprising:
a generator of images to be projected;
an image corrector for applying a corrective processing step which depends on the optical and geometrical characteristics of the windshield, and for producing a deformation of the projected image such that the multiplication effect in the viewed image is reduced; and
an image projector for projecting the corrected image on the windshield, arranged to receive the image after processing and to produce a light flux to be reflected at least partially towards the windshield.

13. A vehicle comprising:
a fascia;
a windshield above the fascia;
a driver's seat; and
an eye level image projector installed on the fascia, the projector comprising an image emitting surface on a liquid crystal display panel which is configured to emit light in the form of a parallel rays incident at a point of incidence on an inside face of the windshield that is visible to an observer in the driver's seat;
a processor associated with the projector and configured, as a function of geometrical and optical characteristics of the windshield, to generate a deformed image at the emitting surface to substantially eliminate a multiplication effect produced by the windshield,
wherein an image reflected by the windshield to the observer (C) is represented by the following formula:

$$C = p(I+D_\kappa)B$$

wherein p represents an overall reflection coefficient applied by the windshield, I is a unity matrix, $D_\kappa$ is a matrix of vertical deviation of κ lines associated with the multiplication effect of at least one dioptre of the windshield, the non-zero κ'th diagonal of which comprises an $\Gamma^1$th element corresponding to the optical characteristics of a ZCrnC of incidence on the windshield in geometrical relationship with said $\Gamma^1$th element, and B is a matrix representing the image projected by the projector.

14. The vehicle of claim 13, further comprising a device selected from the group consisting of: a camera, an infrared camera, a road guidance apparatus, a computer mounted on board the vehicle configured to provide vehicle information and combinations thereof, and wherein the projector receives an output signal from the device.

15. The vehicle of claim 13, wherein ρ varies depending on the wavelength and color produced by the projector.

* * * * *

UNITED STATES PATENT AND TRADEMARK OFFICE
CERTIFICATE OF CORRECTION

PATENT NO. : 7,068,240 B2
APPLICATION NO. : 10/316816
DATED : June 27, 2006
INVENTOR(S) : Leleve et al.

It is certified that error appears in the above-identified patent and that said Letters Patent is hereby corrected as shown below:

Column 14, at line 23, change "eve" to "eye";

at line 36, change "C-$\rho$(I+D$_K$)B" to "C = $\rho$(I+D$_K$)B";

at line 43, change "ZCmc" to "Zone".

Signed and Sealed this

Fifteenth Day of August, 2006

JON W. DUDAS
*Director of the United States Patent and Trademark Office*